United States Patent
Lee et al.

(10) Patent No.: US 6,921,171 B2
(45) Date of Patent: Jul. 26, 2005

(54) COLOR SCROLLING PROJECTION SYSTEM

(75) Inventors: Hee-joong Lee, Anyang-si (KR); Kun-ho Cho, Suwon-si (KR); Dae-sik Kim, Suwon-si (KR); Sung-ha Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/811,491

(22) Filed: Mar. 29, 2004

(65) Prior Publication Data

US 2004/0246446 A1 Dec. 9, 2004

Related U.S. Application Data

(60) Provisional application No. 60/457,915, filed on Mar. 28, 2003.

(30) Foreign Application Priority Data

Jun. 2, 2003 (KR) .................. 10-2003-0035297

(51) Int. Cl.$^7$ .............................................. G03B 21/14
(52) U.S. Cl. .............................. 353/31; 353/38; 348/743
(58) Field of Search ............................. 353/31, 34, 37, 353/38; 348/742, 743, 771; 359/209, 210, 21; 349/5, 7, 8

(56) References Cited

U.S. PATENT DOCUMENTS

| | | | | |
|---|---|---|---|---|
| 5,845,981 A | * | 12/1998 | Bradley | 353/31 |
| 6,288,815 B1 | * | 9/2001 | Lambert | 359/196 |
| 6,591,022 B2 | * | 7/2003 | Dewald | 382/274 |
| 6,619,802 B2 | * | 9/2003 | Janssen et al. | 353/31 |
| 6,698,894 B2 | * | 3/2004 | Anderson | 353/31 |
| 6,771,325 B1 | * | 8/2004 | Dewald et al. | 348/743 |
| 6,811,263 B2 | * | 11/2004 | Kim et al. | 353/31 |
| 6,814,450 B2 | * | 11/2004 | Kim | 353/94 |
| 6,824,270 B2 | * | 11/2004 | Kim et al. | 353/31 |
| 2002/0191154 A1 | | 12/2002 | Shahzad et al. | |
| 2003/0095213 A1 | * | 5/2003 | Kanayama et al. | 348/742 |
| 2004/0057018 A1 | * | 3/2004 | Cho et al. | 353/31 |
| 2004/0061836 A1 | * | 4/2004 | Cho et al. | 353/31 |
| 2004/0066494 A1 | * | 4/2004 | Lee et al. | 353/31 |
| 2004/0085486 A1 | * | 5/2004 | Katoh et al. | 349/5 |
| 2004/0105077 A1 | * | 6/2004 | Kim et al. | 353/31 |
| 2004/0114112 A1 | * | 6/2004 | Kim et al. | 353/31 |
| 2004/0119947 A1 | * | 6/2004 | Kim et al. | 353/31 |
| 2004/0227903 A1 | * | 11/2004 | Kim et al. | 353/84 |

FOREIGN PATENT DOCUMENTS

JP  11-281930 A  10/1999
KR  1999-002347 A  1/1999

* cited by examiner

Primary Examiner—William C. Dowling
(74) Attorney, Agent, or Firm—Sughrue Mion, PLLC

(57) ABSTRACT

A projection system including an adjusting part, a scrolling part, and a color separating part is provided. The adjusting part adjusts the divergence angle of light emitted from a light source. The scrolling part scrolls a plurality of color bars on a light valve. The color separating part separates an incident beam, emitted from the light source and transmitted by the scrolling part, into a plurality of color beams. The adjusting part, the scrolling part, and the color separating part are sequentially arranged from the light source. Since beams of individual colors travel along a single path, the number of required optical components is reduced, thereby making the projection system compact.

26 Claims, 10 Drawing Sheets

COLOR SCROLLING PROJECTION SYSTEM

This application claims the priority of Korean Patent Application No. 2003-35297, filed on Jun. 2, 2003, in the Korean Intellectual Property Office, and the benefit of U.S. Patent Provisional Application No. 60/457,915, filed on Mar. 28, 2003, in the U.S. Patent Trademark Office, the disclosures of which are incorporated herein in their entireties by reference.

BACKGROUND OF THE INVENTION

1. Field of the Invention

The present invention relates to a projection system, and more particularly, to a color scrollable projection system with an optical arrangement that simplifies the path of light.

2. Description of the Related Art

A projection system delivers image information to human beings. In a general projection system, in order to achieve switching for fast information processing, a light valve, such as a liquid crystal display (LCD) or a Digital Micro-mirror Device (DMD), controls the on/off operation of light emitted from a light source on a pixel-by-pixel basis and forms a picture. A magnifying projection optical system enlarges the picture to be displayed on a large screen. Projection systems are classified as 3-panel projection systems or single-panel projection systems according to the number of light valve panels that are used. Many attempts have been being made to develop simple and inexpensive single-panel projection systems that can provide a large, bright picture.

A single-panel color projection system separates white light emitted from a white light into three color beams, namely, red (R), green (G), and blue (B) beams, by using a color wheel; sequentially sends the three color beams to a single light valve; and operates the light valve according to the sequence of color beams received, thereby creating images.

A single-panel color projection system includes a simpler and smaller optical system than a three-panel projection system, in which three separate light valves form color images using an optical separation/combination system. However, the single-panel system provides only ⅓ of the light efficiency of a three-panel projection system because of the use of the color wheel.

A color scrolling method has recently been developed in which the light efficiency of a single-panel projection system is increased. In the color scrolling method, R, G, and B beams, into which white light is separated, is simultaneously sent to different locations on a light valve to form R, G, and B color bars. The R, G, and B color bars are moved at a constant speed by a color scrolling unit, and when all of the R, G, and B beams reach each pixel of the light valve, a color image is formed. If the color scrolling method is adopted, the single-panel projection system can also achieve the same light efficiency as the three-panel projection system.

FIG. 1 is a schematic diagram of a color scrolling projection system. Referring to FIG. 1, white light emitted from a lamp-type light source 102 passes through first and second lens arrays 104 and 105 and through a polarization conversion system (PCS) 106 and is focused by a lens 107. First through fourth dichroic filters 108, 110, 112, and 114 separate the light transmitted by the condenser lens 107 into R, G, and B beams which are then recombined.

More specifically, the R and B beams, for example, pass through the first dichroic filter 108 and travel along a first light path L1, while the G beam is reflected by the first dichroic filter 108 and travels along a second light path L2. The R beam and the B beam on the first light path L1 are separated by the second dichroic filter 110. The R beam continues along the first light path L1, passing through the second dichroic filter 110, and the second dichroic filter 110 reflects the B beam along a third light path L3.

The G and B beams, which travel along the second and third light paths L2 and L3, respectively, are transmitted and reflected, respectively, by the third dichroic filter 112, and are combined. The R, G, and B beams are then all combined by the fourth dichroic filter 114. The combined beam passes through a polarization beam splitter (PBS) 128 and is incident on a light valve 130. Reference numeral 126 indicates a polarizer, reference numeral 132 indicates an analyzer, reference numeral 121 indicates a reflection filter which reflects an R beam, and reference numeral 122 indicates a reflection filter which reflects a B beam.

First, second, and third prisms 120, 116 and 118 are disposed in the first through third light paths L1, L2, and L3, respectively. As the first, second, and third prisms 120, 116, and 118 rotate at a uniform speed, R, G, and B color bars formed on the light valve 130 are properly scrolled.

First, second, and third slits 119, 115, and 117, for determining the widths of the R, G, and B beams, are installed in the first, second, and third light paths L1, L2, and L3, respectively, and in front of the first, second, and third prisms 120, 116, and 118, respectively. The widths of color bars formed on the light valve 130 depend on the widths of the first, second, and third slits 119, 115, and 117. Therefore, by varying the widths of the first, second, and third slits 119, 115, and 117, the widths of the color bars may be decreased, and thus, black bars K may be formed between adjacent color bars. Alternately, the R, G, and B bars may be enlarged such that overlapping portions P may be formed between adjacent color bars.

R, G, and B beams transmitted by the first, second, and third slits 119, 115, and 117 are scrolled by rotation of the first, second, and third prisms 120, 116, and 118, which serve as a scrolling unit.

In the above-described conventional projection system, while the first through fourth dichroic filters 108, 110, 112, and 114 separate light into R, G, and B beams and combining the R, G, and B beams, R, G, and B color bars having desired beam widths can be scrolled on the light valve 130 by using the first through third slits 119, 115, and 117 and the first through third rotating prisms 120, 116, and 118, which are disposed on first through third light paths L1, L2, and L3.

The scrolling of the R, G, and B color bars due to the rotation of the first through third prisms 120, 116, and 118 is illustrated in FIG. 2. Scrolling represents the movement of color bars formed on the light valve 130 when the first, second, and third prisms 120, 116, and 118 corresponding to R, G, and B colors, respectively, are synchronously rotated.

A color image is obtained by controlling the light valve 130 in synchronization with the movement of the color bars formed on the light valve 130. In other words, beams incident on the light valve 130 via the PBS 128 form a color image as individual pixels of the light valve 130 are turned on or off according to an image signal. The color image is magnified by a projection lens 134 and projected onto a screen (not shown).

Due to the use of the complex system described above and the complex light paths utilized therein, the conventional projection system is bulky and its assembly is complicated. In particular the above-described system requires a plurality of dichroic filters and both a slit and a scrolling unit for each of the R, G, and B beams. Hence, the conventional projection system is complicated, and requires a large number of optical components.

Furthermore, since color scrolling is performed by individually rotating each of the three prisms 120, 116, and 118, synchronization of the prisms with the light valve 130 is difficult. In other words, in order to produce a color picture using a scrolling technique, color bars as shown in FIG. 2 must be scrolled at a constant speed. Hence, the conventional projection system must synchronize the light valve 130 with the three prisms 120, 116, and 118 in order to achieve proper scrolling. However, controlling the synchronization is not easy. Due to the circular motion of the scrolling prisms 120, 116, and 118, the color scrolling speed is irregular, consequently deteriorating the quality of the resultant image.

Three motors for rotating the first, second, and third scrolling prisms 120, 116, and 118 generate a lot of noise during operation. Further, the cost of manufacturing a system with three motors is higher than that of manufacturing a color wheel type projection system which utilizes a single motor.

SUMMARY OF THE INVENTION

The present invention provides a color scrollable projection system requiring fewer optical components, thus having a simplified light path and making the projection system more compact.

According to a first exemplary embodiment of the invention, a projection system includes an adjusting part which adjusts the divergence angle or etendue of light emitted from a light source, a scrolling part which scrolls a plurality of color bars on a light valve, and a color separating part which separates an incident beam emitted from the light source and transmitted by the scrolling part into a plurality of color beams. The adjusting part, the scrolling part, and the color separating part are sequentially arranged from the light source.

The scrolling part may include a scrolling unit which includes at least one lens cell and converts a rotation of the lens cell into a rectilinear motion of a lens array on which light is incident. A plurality of color bars on the light valve may be scrolled with a rotation of the scrolling unit.

The color separating part may include a color separator which includes a plurality of dichroic filters which are disposed in parallel and which each reflect light in a specific wavelength range and which transmit beams in all other wavelength ranges.

According to a second exemplary embodiment of the invention, a projection system includes an adjusting part which adjusts the divergence angle or etendue of light emitted from a light source; a color separating part which separates an incident beam into a plurality of color beams by using a plurality of dichroic filters each of which reflects light in a specific wavelength range; and a scrolling part with a scrolling unit which includes at least one lens cell and which converts a rotation of the lens cell into a rectilinear motion of a lens array through which light passes. A plurality of color bars on the light valve are scrolled as the scrolling unit rotates. The adjusting part, the scrolling part, and the color separating part are sequentially arranged from the light source.

The color separating part may include a color separator which includes a plurality of dichroic filters which are disposed at different angles.

The color separating part may include an optical pipe which is made up of a plurality of prisms each of which includes a dichroic filter to reflect light of a specific color.

Light directed toward the adjusting part may be diverged after being focused or converged. The adjusting part may be located at or around the point where the light is focused.

The adjusting part may be a spatial filter having a slit.

The projection system may further include a collimating lens which collimates light transmitted by the adjusting part to transmit approximately parallel light.

The at least one lens cell may be spirally arranged on the scrolling unit.

The scrolling unit may be a disk.

The projection system may further include first and second fly-eye lenses which are disposed between the scrolling unit and the light valve, which each include lens cells matched with the lens cells of the scrolling unit in a one-to-one correspondence and which each transmit light transmitted by the scrolling unit to the light valve.

The projection system may further include a relay lens which is disposed between the second fly-eye lens and the light valve and which transmits light transmitted by the second fly-eye lens so that beams of different colors are condensed on different locations on the light valve.

The projection system may further include a plurality of cylindrical lenses which are disposed in front of and behind the scrolling unit so as to adjust the width of light incident on the scrolling unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
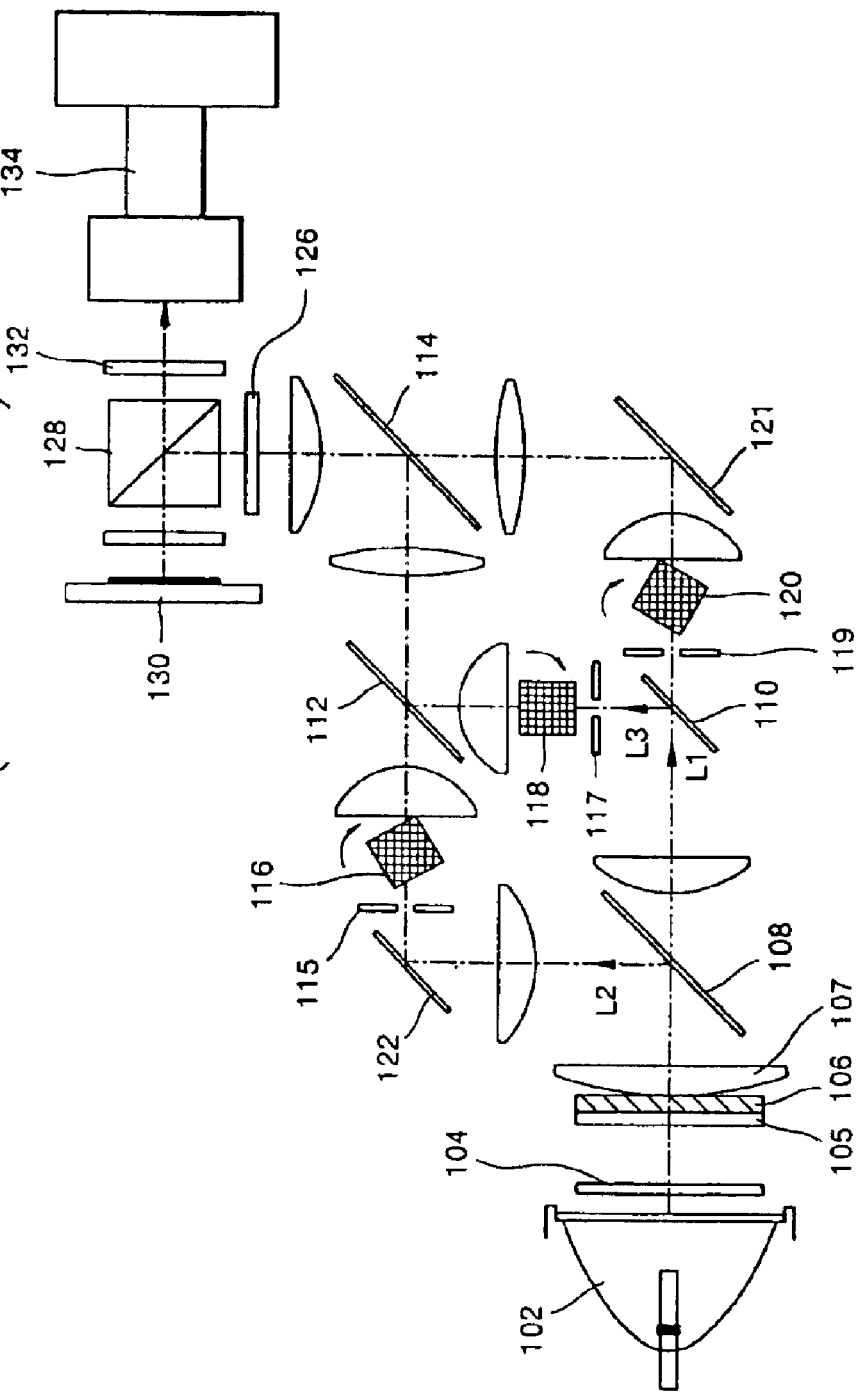
FIG. 1 is a schematic diagram of a conventional color scrolling projection system.
Figure 2:
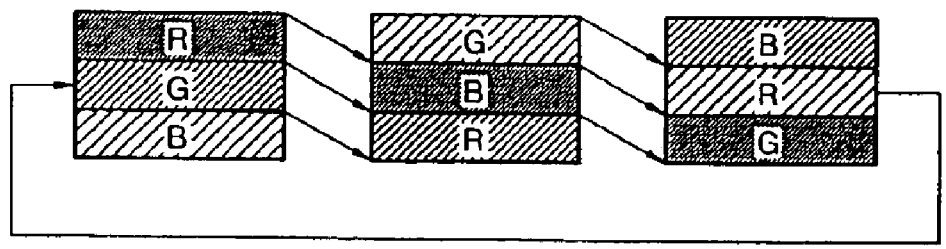
FIG. 2 illustrates R, G, and B color bars to explain the color scrolling operation.

The present invention will now be described more fully with reference to the accompanying drawings, in which illustrative, non-limiting embodiments of the invention are shown. In the drawings, like reference numbers refer to like elements throughout, and the sizes of elements may be exaggerated for clarity.

Figure 3:
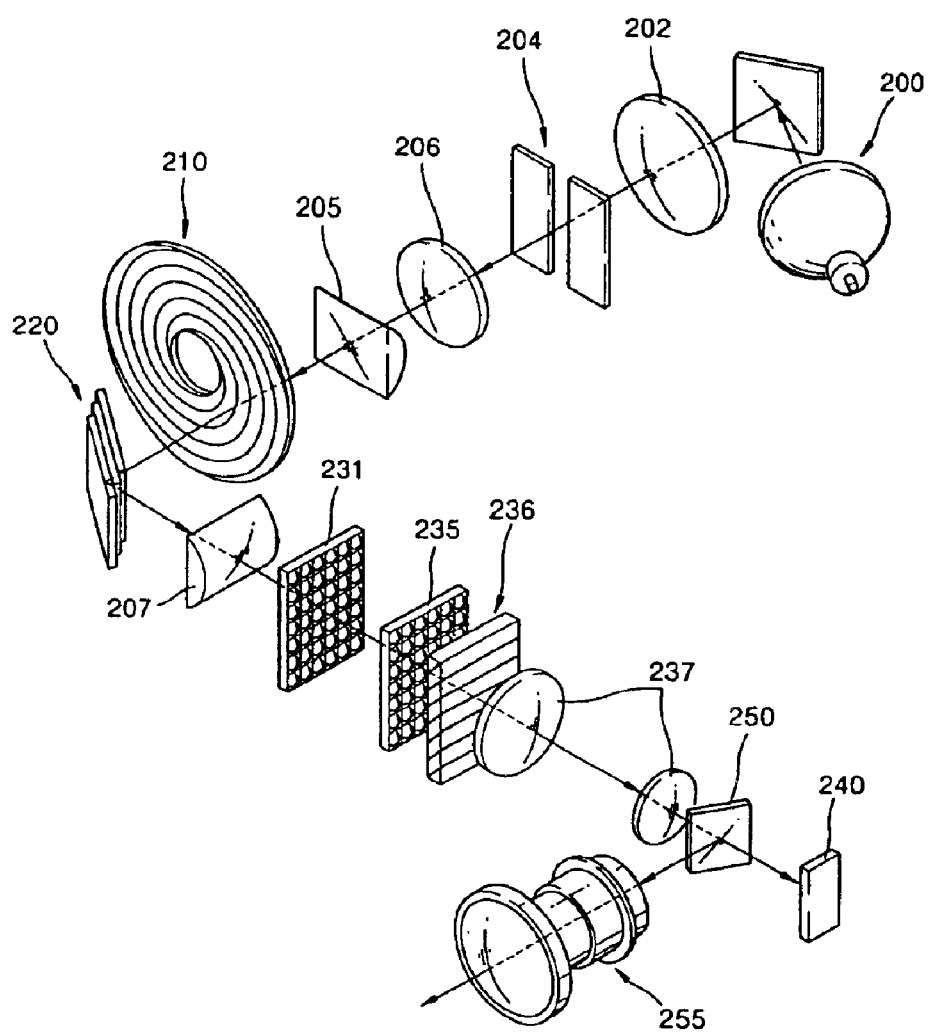
FIG. 3 is a perspective view schematically showing an arrangement of a color scrolling projection system according to a first exemplary embodiment of the present invention.
Figure 4:
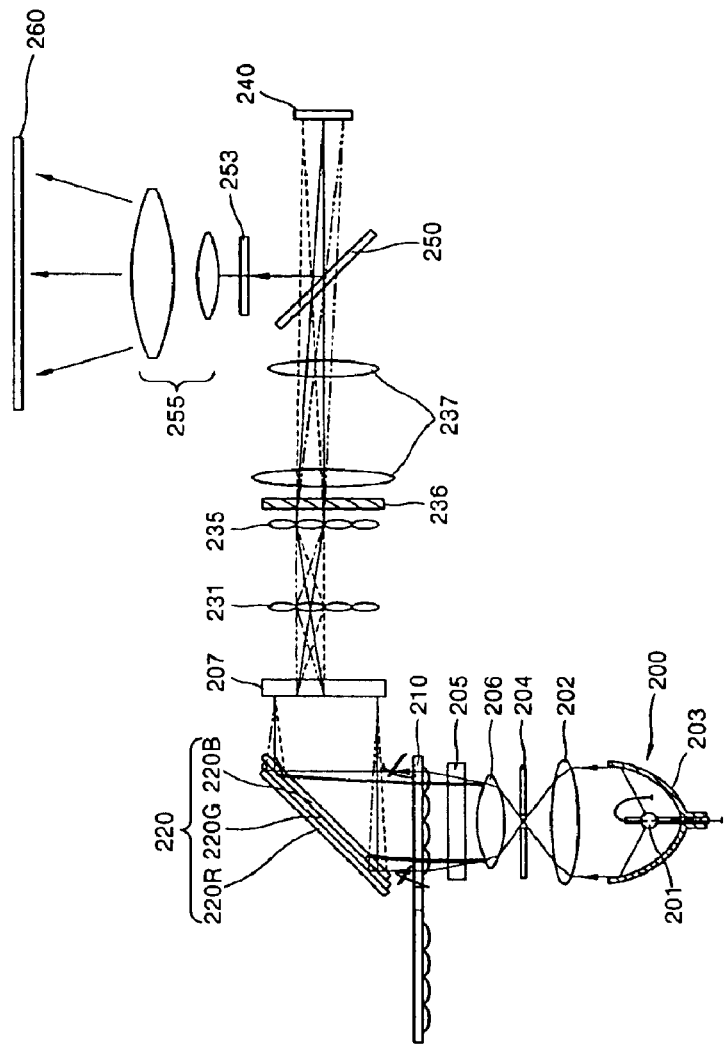
FIG. 4 shows the path of light traveling in the color scrolling projection system of FIG. 3.

FIGS. 3 and 4 schematically show an arrangement of a projection system according to a first exemplary embodiment of the present invention. In this projection system, an adjusting part for adjusting the divergence angle (or etendue) of light emitted from a light source 200, a scrolling part for scrolling a plurality of color bars on a light valve 240, and a color separation part for separating the light emitted from the light source 200 into a plurality of color beams are sequentially disposed from the light source.

Referring to FIGS. 3 and 4, the color scrolling projection system according to the first exemplary embodiment of the present invention includes a light source 200, a spatial filter 204, a scrolling unit 210, a color separator 220, and a light valve 240. The spatial filter 204 controls the divergence angle of light emitted from the light source 200. The scrolling unit 210 scrolls a plurality of color bars. The color separator 220 separates the light emitted from the light source 200 into a plurality of color beams. The light valve 240 processes the color bars transmitted by the color separator 220 according to an image signal and forms a picture.

The light source may be a lamp which emits white light. As illustrated, the light source 200 comprises a lamp 201, for generating unpolarized white light, and a reflection mirror 203, for reflecting the white light emitted from the lamp 201 and for guiding the path of the reflected light. The reflection mirror 203 may be an elliptical mirror whose first focal point is the position of the lamp 201 and whose second focal point is a point where light is focused. Alternatively, the reflection mirror 203 may be a parabolic mirror which reflects and collimates light beams emitted from the lamp 201. The reflection mirror 203 shown in FIGS. 3 and 4 is a parabolic mirror.

If the parabolic mirror is used as the reflection mirror 203 as shown in FIGS. 3 and 4, a lens 202 for focusing collimated light is also included.

A collimating lens 206 is further included to collimate light beams focused by the lens 202 and diverged upon passing through the spatial filter 204.

The collimating lens 206 collimates light beams emitted from the light source 200 to form a parallel beam with a small diameter. The collimating lens 206 is disposed so as to form a parallel beam having about ⅕ the diameter of the beam emitted from the light source 200. Hence, the optical system of the projection system can be made smaller.

The spatial filter 204 that has a slit is installed between the light source 200 and the collimating lens 206. The spatial filter 204 controls a divergence angle of the light emitted from the light source 200 and is located at or around the focal point of the lens 202. The light traveling toward the spatial filter 204 mat be diverged after being focused or converged.

The spatial filter 204 is designed to control the width of the slit in a color separation direction or in a color scrolling direction.

Figure 10:
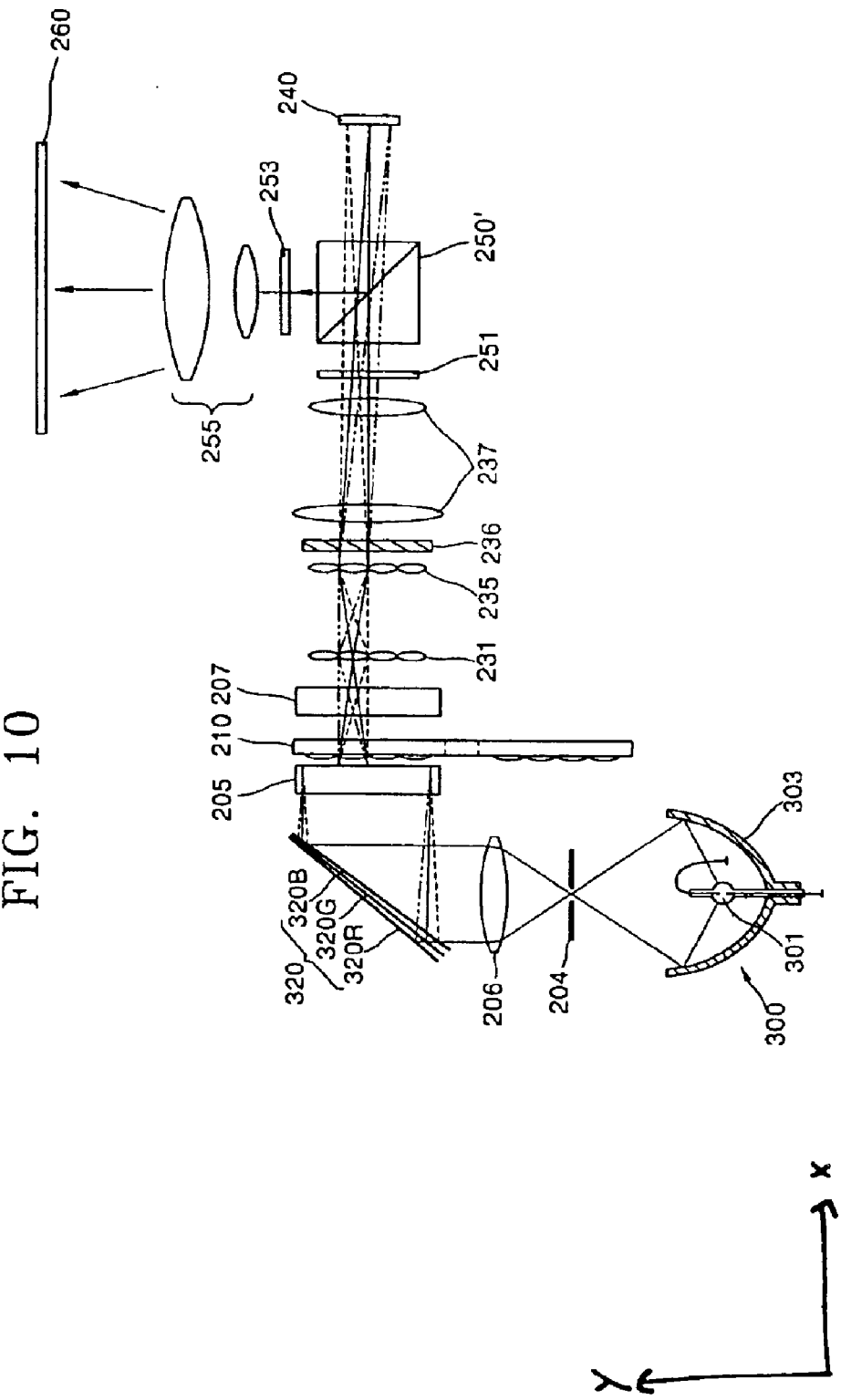
FIG. 10 is a schematic diagram of a color scrolling projection system according to a second exemplary embodiment of the present invention.
Figure 11:
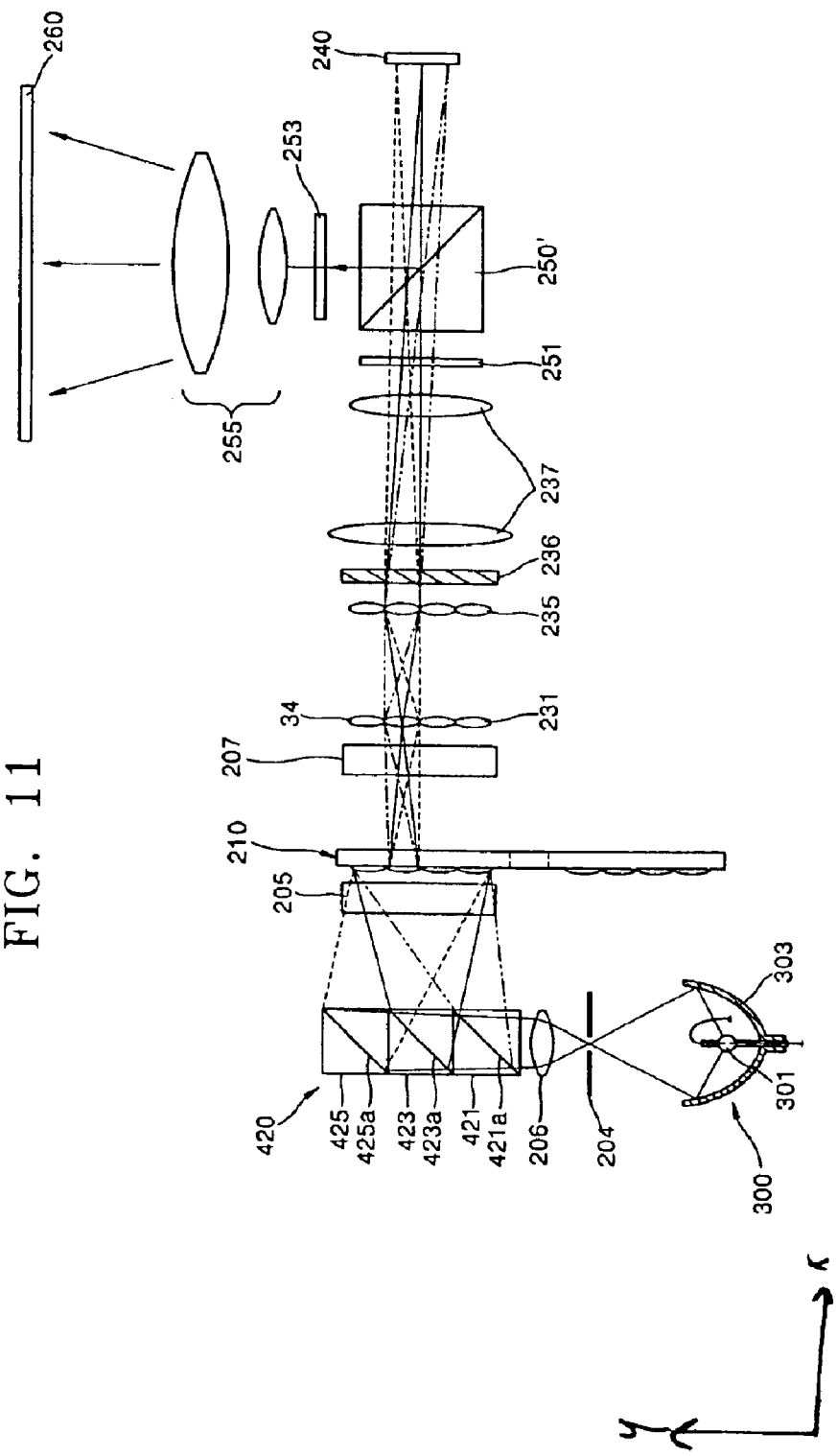
FIG. 11 is a schematic diagram of a modified example of a projection system according to the second exemplary embodiment of the present invention.

As shown in FIGS. 10 and 11 to be described later, the projection system according to a second exemplary embodiment of the present invention may use a lamp which emits a focused light as the light source 200, without including the lens 202. In this case, the spatial filter 204 is located at or around a focal point of the focused light emitted from the light source 200, that is, at or around a focal point of an elliptical mirror.

If the etendue of the projection system or the divergence angle of incident light is controlled using the spatial filter 204, color bars can be distinguished accurately from one another, thereby improving the quality of the resultant image. In other words, an overlapping portion may form between adjacent color bars if light emitted from the light source 200 diverges at an angle greater than an acceptance angle. Hence, the spatial filter 204 filters light having a divergence greater than an acceptance angle so that color bars can be distinguished accurately from one another.

If black bars are formed by reducing of the size of the color bars by controlling the width of the slit, an image signal can be smoothly processed in a case where a liquid crystal display is used as the light valve 240. In other words, in the case where a liquid crystal display is used as the light valve 240, an image signal changes every time the locations of color bars are changed upon consecutive scrolling. Consecutive processing of changed image signals may be difficult. In this case, time is required between adjacent color bars in order to process an image signal. This time is obtained by the formation of black bars between adjacent color bars. The black bars are formed by adjusting the width of the slit of the spatial filter 204, thereby decreasing the size of the color bars.

Etendue denotes an optical conservation quantity in an optical system. Given that the starting point of the optical system is a light source, and the object of the optical system is a light valve, if the etendue of the light source is greater than that of the entire optical system, color bars are enlarged, so colors mix at the boundaries between adjacent color bars. On the other hand, if the etendue of the light source is smaller than that of the entire optical system, color bars are smaller, and black bars form between adjacent color bars. Since the spatial filter 204 can control the etendue, color mixture at the boundaries between adjacent color bars can be prevented, and black bars can be formed between adjacent bars.

The spatial filter 204 may have a different structure depending on its purpose. For example, the spatial filter 204 may be constructed to independently control the size of each of the color bars, thereby improving a color gamut and controlling a color balance.

In the first exemplary embodiment, the color separator 220 comprises a plurality of dichroic filters, for example, first, second, and third reflection-type dichroic filters 220B, 220G, and 220R. The filters 220B, 220G, and 220R are disposed in parallel and each reflects incident light of a particular wavelength range, emitted from the light source 200 and transmitted by the scrolling unit so as to separate the white light into a plurality of color beams.

FIGS. 3 and 4 show an example in which the color separator 220 includes first, second, and third dichroic filters 220B, 220G, and 220R, which reflect B, G, and R beams, respectively, to separate the white light emitted from the light source 200 into B, G, and R beams.

Specifically, the first dichroic filter 220B reflects a B beam of incident white light emitted from the light source 200 and transmits the G and R beams. The second dichroic filter 220G reflects the G beam of the G and R beams transmitted by the first dichroic filter 220B and transmits the R beam. The third dichroic filter 220R reflects the R beam transmitted by the first and second dichroic filters 220B and 220G.

The sequence of arrangement of the first, second, and third dichroic filters 220B, 220G, and 220R may vary.

The interval between adjacent two dichroic filters among the first, second, and third dichroic filters 220B, 220G, and 220R is determined so that the B, G, and R beams produced by the color separator 220 are incident on an identical lens cell of a first fly-eye lens 231 without mixing with one another.

As discussed, when a single-plate color projection system, such as illustrated in FIGS. 3 and 4, adopts a color scrolling technique, it can obtain the same level of light efficiency as that of a three-plate color projection system.

According to the color scrolling technique, the color beams, R, G, and B, into which the white light is separated, are simultaneously sent to different locations on the light valve 240 to form a plurality of color bars, and the color bars are moved at a constant speed in a specific way so that all of the color beams reach each pixel of the light valve 240 to form a color image. When the white light is separated into R, G, and B beams, three color bars must be formed on different areas of the light valve 240 each corresponding to approximately ⅓ of the entire area of the light valve 240. Since an image cannot be produced until all of the R, G, and B beams reach each pixel of the light valve 240, the R, G, and B beams must be moved at a constant speed.

The color scrolling projection system according to the present invention includes a scrolling unit 210 to achieve the above-described color scrolling.

The color scrolling projection system according to the present invention may also include first and second fly-eye lenses 231 and 235 on the light path between the scrolling unit 210 and the light valve 240. It may further include a relay lens 237 between the second fly-eye lens 235 and the light valve 240.

Figure 5:
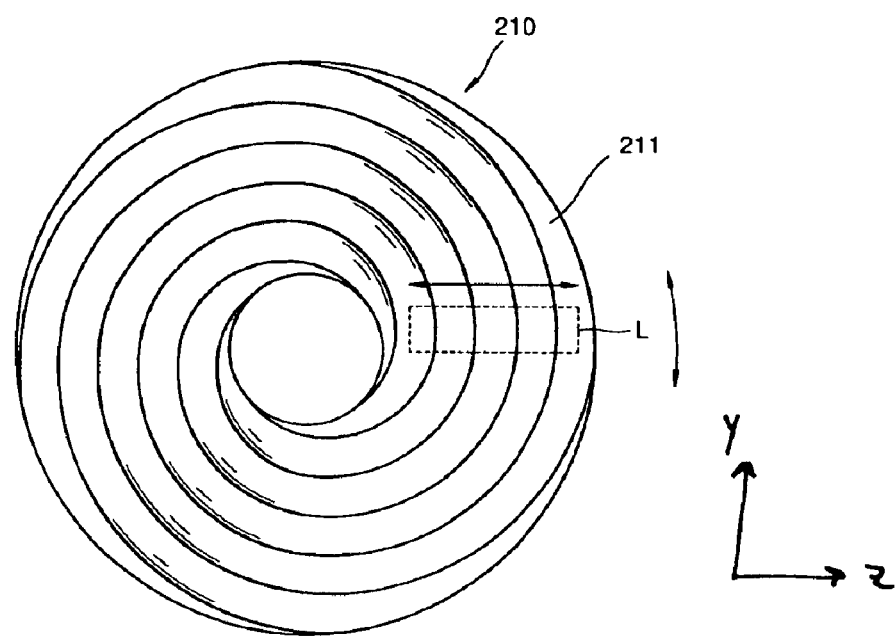
FIG. 5 is a front view of the scrolling unit used in the color scrolling projection system of FIGS. 3 and 4.

Preferably, but not necessarily, the color scrolling projection system according to the present invention further includes first and second cylindrical lenses 205 and 207 in front of and behind the scrolling unit 210, respectively, to control the width of a beam incident on the scrolling unit 210. The first cylindrical lens 205 reduces the width of a light beam incident on the scrolling unit 210, obtaining a beam L with a reduced width as illustrated in FIG. 5. The reduction of the width of the incident beam contributes to a decrease in the light loss as described later. The beam transmitted by the scrolling unit 210 is returned to its original width by the second cylindrical lens 207.

As illustrated in FIG. 5, the scrolling unit 210 comprises at least one lens cell 211. The scrolling unit 210 scrolls R, G, and B light by converting the rotation of the lens cells into the rectilinear motion of an area of the lens cells through which the light passes.

FIG. 5 is a front view of a spiral lens disk used as the scrolling unit 210. As illustrated in FIG. 5, the scrolling unit 210 includes at least one lens cell 211, which is spirally disposed on the scrolling unit 210. Preferably, but not necessarily, the lens cells 211 are arrayed at equal intervals and have the same cross-sections.

Figure 6:
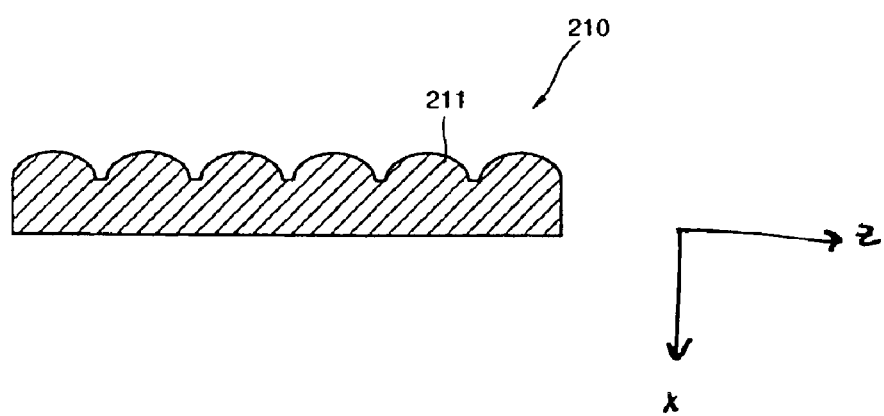
FIG. 6 shows an example of the cross-section of the lens cells of the scrolling unit of FIG. 5.

The lens cells 211 of the scrolling unit 210 may be cylindrical lens cells having circularly arched cross-sections as illustrated in FIG. 6. Alternatively, the lens cells 211 of the scrolling unit 210 may be optical diffraction elements or optical hologram elements.

The lens cells 211 of the scrolling unit 210 condense light received from the light source 200 and scroll color bars by a rotation of the scrolling unit 210.

When the scrolling unit 210 including the spiral lens cells 211 is rotated by a motor, the rotation of the lens cells 211 is converted into a rectilinear motion of an area of the scrolling unit 210 through which light passes. Consequently, color scrolling is achieved.

More specifically, since the lens cells 211 are spirally arranged, when the disk-type scrolling unit 210 is rotated clockwise at a constant speed, it appears from the point of view of the beam L that the cylindrical lens array rectilinearly moves outward at a constant speed. By rotating the scrolling unit 210 in a counter-clockwise direction, the cylindrical lens array appears to move inward.

Since the beam L whose width is reduced by the first cylindrical lens 205 passes through the scrolling unit 210 as illustrated in FIG. 5, an effect can be obtained whereby the light L appears to pass through a lens array that moves rectilinearly.

Therefore, when the scrolling unit 210 is rotated at a constant speed, the color beams separated by the color separator 220 are repetitively scrolled, thus scrolling the color bars on the light valve 240.

In the present invention, scrolling is performed by rotating the scrolling unit 210 in one direction, without changing the rotation direction, thereby achieving continuous and consistent scrolling. Further, since the single scrolling unit is used to scroll all color beams, the scrolling speeds of all of the color bars are identical. Thus, the synchronization of the color bars is easily controlled.

The number of lens cells 211 included in the scrolling unit 210 and the rotating speed of the scrolling unit 210 may be controlled so that the scrolling unit 210 is synchronized with the operating frequency of the light valve 240. For example, the higher the operating frequency of the light valve 240, the more lens cells 211 are included in the scrolling unit 240 so that the scrolling speed can be increased while maintaining a constant rotation speed of the scrolling unit 210. Alternatively, the scrolling unit 210 can be synchronized with the operating frequency of the light valve 240 by controlling the rotation speed of the scrolling unit 210 while maintaining a constant number of the lens cells 211 of the scrolling unit 210.

Figure 7:
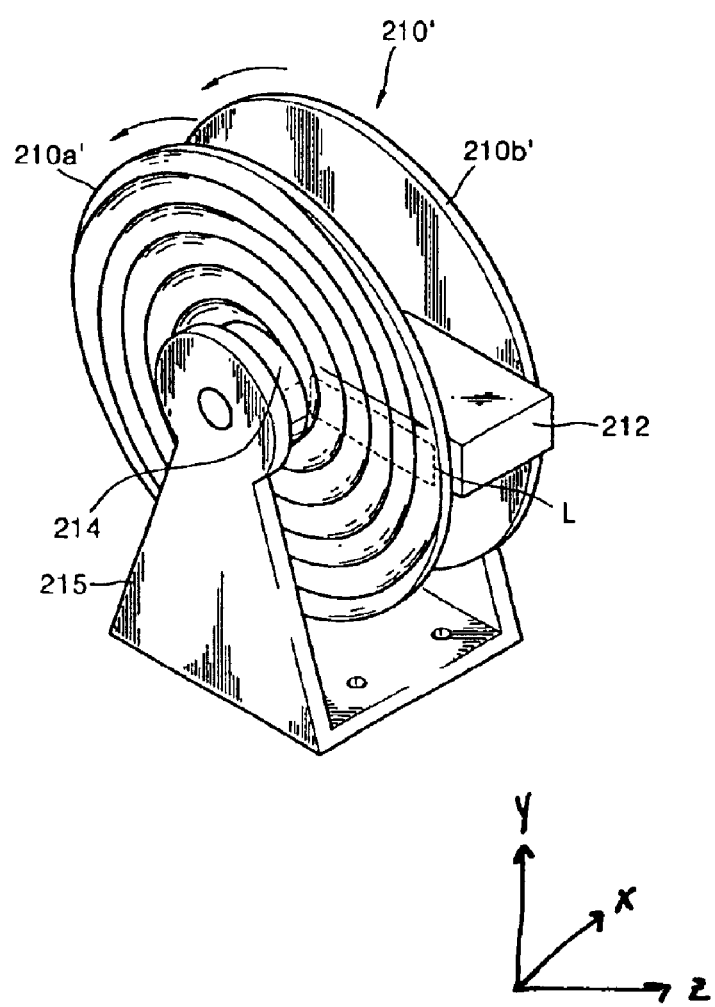
FIG. 7 is a perspective view of another scrolling unit that can be used in the projection system of FIGS. 3 and 4

Although an example where the projection system of FIGS. 3 and 4 includes the scrolling unit 210 which is a single disk has been described above, the scrolling unit 210 may be replaced by a scrolling unit 210' made up of a plurality of disks as illustrated in FIG. 7.

Referring to FIG. 7, the scrolling unit 210' includes a first disk 210a', which includes at least one spirally arranged lens cell 211 to scroll incident light, and a second disk 210b', which is disposed a predetermined distance from the first disk 210a' to correct the divergence angle of light transmitted by the first disk 210a'. Similar to the first disk 210a', the second disk 210b' includes at least one spirally arranged lens cell 211. Each of the first and second disks 210a' and 210b' is substantially the same as the single disk of the scrolling unit 210 illustrated in FIG. 5.

Preferably, but not necessarily, the scrolling unit 210' further includes a glass rod 212, which is interposed on the light path between the first and second disks 210a' and 210b' to control the divergence angle of light transmitted by the first disk 210a'. As described above, the glass rod 212 transmits light from the lens cells of the first disk 210a' to the lens cells of the second disk 210b' without diverging the light. The first and second disks 210a' and 210b' are supported by a bracket 215 such that they are rotated at the same speed by a driving source 214.

As described above, the scrolling unit 210 may be made up of two disks on each of which at least one lens cell is spirally arranged. The two disks are installed on an identical driving axis to achieve color scrolling. Like the scrolling unit comprising a single disk, the scrolling unit 210' including two disks can maintain a constant scrolling speed of the color bars. The scrolling unit 210 may have various structures enabling it to scroll a plurality of color bars. For example, the scrolling unit 210 may be a cylinder on the outer circumference of which lens cells are spirally arranged.

When the dichroic filters of the color separator 220 are disposed parallel to one another, the scrolling unit 210 is disposed between the light source 200 and the color separator 220 as illustrated in FIGS. 3 and 4. In this case, selective reflection by each of the dichroic filters of the color separator 220 causes a difference among the lengths of the paths of the color beams. As a result, the color beams can be incident on the first fly-eye lens 231 without mixing with one another.

The lens cells of the first fly-eye lens 231 match those of the second fly-eye lens 235 in a one-to-one correspondence, and the lens cells 211 of the scrolling unit 210 also correspond on a one-to-one basis with those of each of the first and second fly-eye lenses 231 and 235.

Preferably, but not necessarily, the first fly-eye lens 231 is located around a focal plane of the scrolling unit 210 so that color beams, into which light transmitted by the scrolling unit 210 is separated by the color separator 220, are incident on lens cells of the first fly-eye lens 231 without mixing. In this case, the color beams having different path lengths are incident on different locations on each of the lens cells of the first fly-eye lens 231.

The color beams diverge while passing through the first fly-eye lens 231, and beams of different colors are combined together and collimated by the second fly-eye lens 235.

The relay lens 237 transmits the collimated color beams to different locations on the light valve 240 to form color bars. Although FIGS. 3 and 4 show an example where the relay lens 237 is made up of two lenses, the relay lens 237 may be a single lens or may comprise three or more lenses.

When the first and second fly-eye lenses 231 and 235 and the relay lens 237 are included in the projection system according to the present invention, the color beams converged by the scrolling unit 210 are transmitted by the first and second fly-eye lenses 231 and 235 in a one-to-one correspondence and are focused by the relay lens 237 to form color bars on the light valve 240.

The first cylindrical lens 205 reduces the width of a beam emitted from the light source 200 so that a beam with a reduced width is incident on the scrolling unit 210. The second cylindrical lens 207 returns the beam transmitted by the scrolling unit 210 to its original width.

When the first cylindrical lens 205 is disposed in front of the scrolling unit 210 so that a beam with a reduced width indicated by a long box of FIG. 5 passes through the scrolling unit 210, an effect where an incident beam appears to pass through a rectilinearly moving cylindrical lens array can be produced.

When the scrolling unit 210 is rotated at a constant speed, the R, G, and B beams are repetitively scrolled, and accordingly, color bars are scrolled on the light valve 240.

Figure 8A:
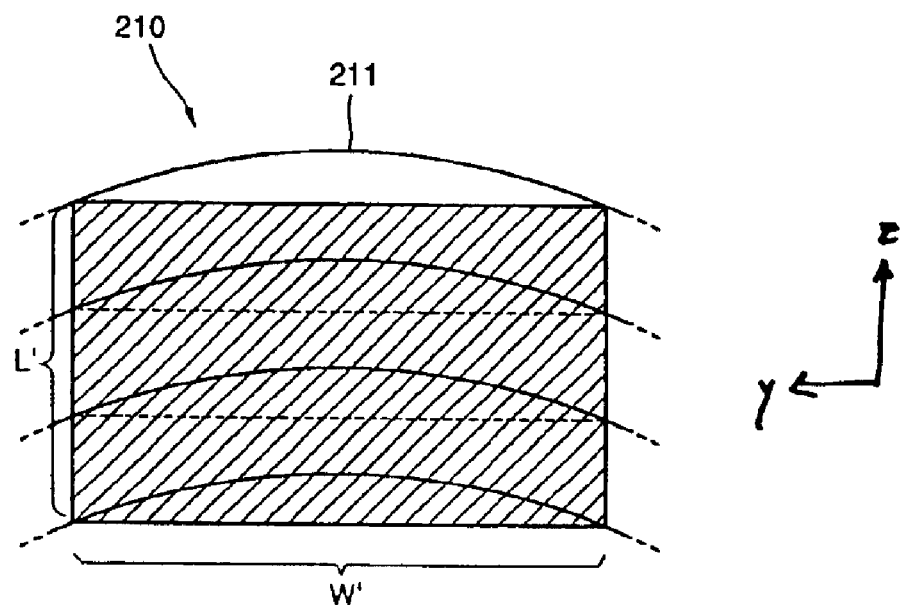
FIG. 8A illustrates the shape of light incident on a scrolling unit when no cylindrical lenses are used in the color scrolling projection system of FIGS. 3 and 4.
Figure 8B:
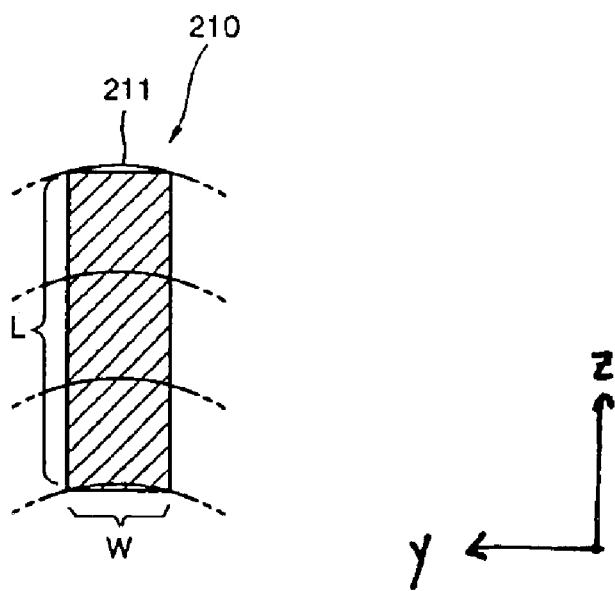
FIG. 8B illustrates the shape of light incident on a scrolling unit when a first cylindrical lens is used in the color scrolling projection system of FIGS. 3 and 4.

FIG. 8A illustrates the cross section of a beam L' that is emitted from the light source 200 and incident on the scrolling unit 210 without passing through the first cylindrical lens 205. Beam L' has a width W'. FIG. 8B illustrates the cross section of a beam L that has a width W reduced by the first cylindrical lens 205 and which is then incident on the scrolling unit 210. When a beam passing through the scrolling unit 210 is relatively wide, that is, in the case of the beam L', the curved shape of the array of spirally arranged lens cells 211 does not match with that of the beam L', and thus there is light loss over an unmatched area. To minimize the light loss, the first cylinder lens 205 is included so that the beam L with a reduced width W is produced as illustrated in FIG. 8B. The shape of the array of spirally arranged lens cells 211, as illustrated in FIG. 8B, aligns more closely with that of the beam L. Consequently, the light loss is reduced through the use of the cylindrical lens.

In other words, the light loss can be reduced by adjusting the width of a beam by using the first and second cylindrical lenses 205 and 207.

Referring back to FIGS. 3 and 4, the light valve 240 forms a color picture by controlling the color bars according to an image signal.

The R, G, and B bars formed on the light valve 240 are scrolled as the scrolling unit 210 rotates. Hence, when the pixels of the light valve 240 are processed in synchronization with the scrolling motion of the color bars, a color image is formed. The color image produced by the light valve 240 is magnified by a projection lens unit 255 and projected onto a screen 260.

FIGS. 3 and 4 show an example where a reflective liquid crystal display which displays an image using a polarization change, for example, a reflective liquid crystal on silicon (LCOS) display, is used as the light valve 240.

As illustrated in FIGS. 3 and 4, when a reflective liquid crystal display which displays an image using a polarization change is used as the light valve 240, a polarization beam splitter (PBS) 250 for transmitting or reflecting an incident light according to a polarization of the incident light is included to direct light received from an illumination system toward the light valve 240 and to direct light reflected by the light valve 240 toward the projection lens unit 255. A polarization conversion system (PCS) 236 is also included to change the unpolarized light emitted from the lamp-type light source 200 to a light with a single linear polarization.

For example, the PBS 250 transmits light with a first linear polarization toward the light valve 240 and reflects light with a second linear polarization orthogonal to the first linear polarization toward the projection lens unit 255. The PBS 250 of FIGS. 3 and 4 is a plate-type PBS.

In FIGS. 3 and 4, the PCS 236 is disposed in front of the second fly-eye lens 235. However, the PCS 236 may be disposed at a different location. For example, the PCS 236 may be disposed between the light source 200 and the scrolling unit 210, between the spatial filter 204 and the collimating lens 206. Alternatively, the PCS 236 may be disposed between the second fly-eye lens 235 and the relay lens 237.

For example, the PCS 236 includes a polarization beam splitter (PBS), a reflection member, and a half wave plate, such as disclosed in U.S. patent Publication No. 2002/0191154 A1.

The PBS included in the PCS 236 transmits light with one linear polarization of light emitted from the light source 200 and reflects light with the other linear polarization. The reflection member re-reflects the light reflected by the PBS so that the re-reflected light travels parallel to the light transmitted by the PBS. The half wave plate is, for example, disposed on the path of the light reflected by the PBS and changes the polarization of the light reflected by the PBS to be the same as the polarization of the light transmitted by the PBS. Thus, the PCS 236 emits a light with a single linear polarization.

The use of the PCS 236 enables light emitted from the light source 200 to be maximally utilized, thereby increasing light efficiency.

In the operation of a projection system according to the above-described first exemplary embodiment of the present invention, first, approximately unpolarized white light emitted from the light source 200 is focused by the lens 202, and the incidence angle or etendue of the convergent light is adjusted by the spatial filter 204. Light transmitted by the spatial filter 204 is collimated by the collimating lens 206. The width of the collimated light is reduced by the first cylindrical lens 205, and the light with a reduced width is incident on the scrolling unit 210.

The light transmitted by the scrolling unit 210 is separated into a plurality of color beams, namely, R, G, and B beams, by the color separator 220. The color beams are incident on different locations on each of the lens cells of the first fly-eye lens 231,. The reduced width of light is returned to its original width by the second cylindrical lens 207.

The color beams diverge upon passing through the first fly-eye lens 231, and the divergent beams of different colors are combined and collimated in the second fly-eye lens 235. The second fly-eye lens 235 thus emits parallel beams.

The parallel color beams transmitted by the first and second fly-eye lenses 231 and 235 are changed to beams with a single linear polarization by the PCS 236. The beams with a single linear polarization are incident on different areas of the light valve 240, thereby forming R, G, and B color bars.

The color beams with a single linear polarization pass through the relay lens 237 and the PBS 250 and travel toward the light valve 240. As discussed, a polarization-dependent display such as a reflective liquid crystal display is used as the light valve 240, the polarization of light reflected by the light valve 240 is changed according to an image signal. The beam with the second linear polarization corresponding to an image signal of the beam reflected by the light valve 240 is reflected by the PBS 250 toward the projection lens unit 255, magnified by the projection lens unit 255, and projected onto the screen 260.

The R, G, and B color bars formed on the light valve 240 are scrolled with a rotation of the scrolling unit 210.

Specifically, as described, the scrolling unit 210 rotates clockwise and it appears that an area of the lens array through which light passes moves rectilinearly outward. Thereby, if color bars are first formed on the light valve 240 in an order of R, G, and B, the locations on the first fly-eye lens 231 on which the color beams are incident change according to the rotation of the scrolling unit 210. Accordingly, color bars in an order of G, B, and R are formed, and then color bars in an order of B, R, and G are formed. Such color bar scrolling periodically repeats.

Hence, when the scrolling unit 210 is rotated in synchronization with an image signal which controls the light valve 240 on a pixel-by-pixel basis, the R, G, and B bars are scrolled to form a color image.

As described above, the projection system according to the first exemplary embodiment of the present invention includes an adjusting part for adjusting the divergence angle (or etendue) of light, a scrolling part for scrolling a plurality of color bars, and a color separation part for separating white light into a plurality of color beams, which are sequentially disposed from the light source 200. The projection system of the first exemplary embodiment scrolls all color bars by using a single scrolling unit and accordingly has a single-plate structure utilizing only a single light valve, thereby reducing both the number of required components and the size of the system.

Figure 9:
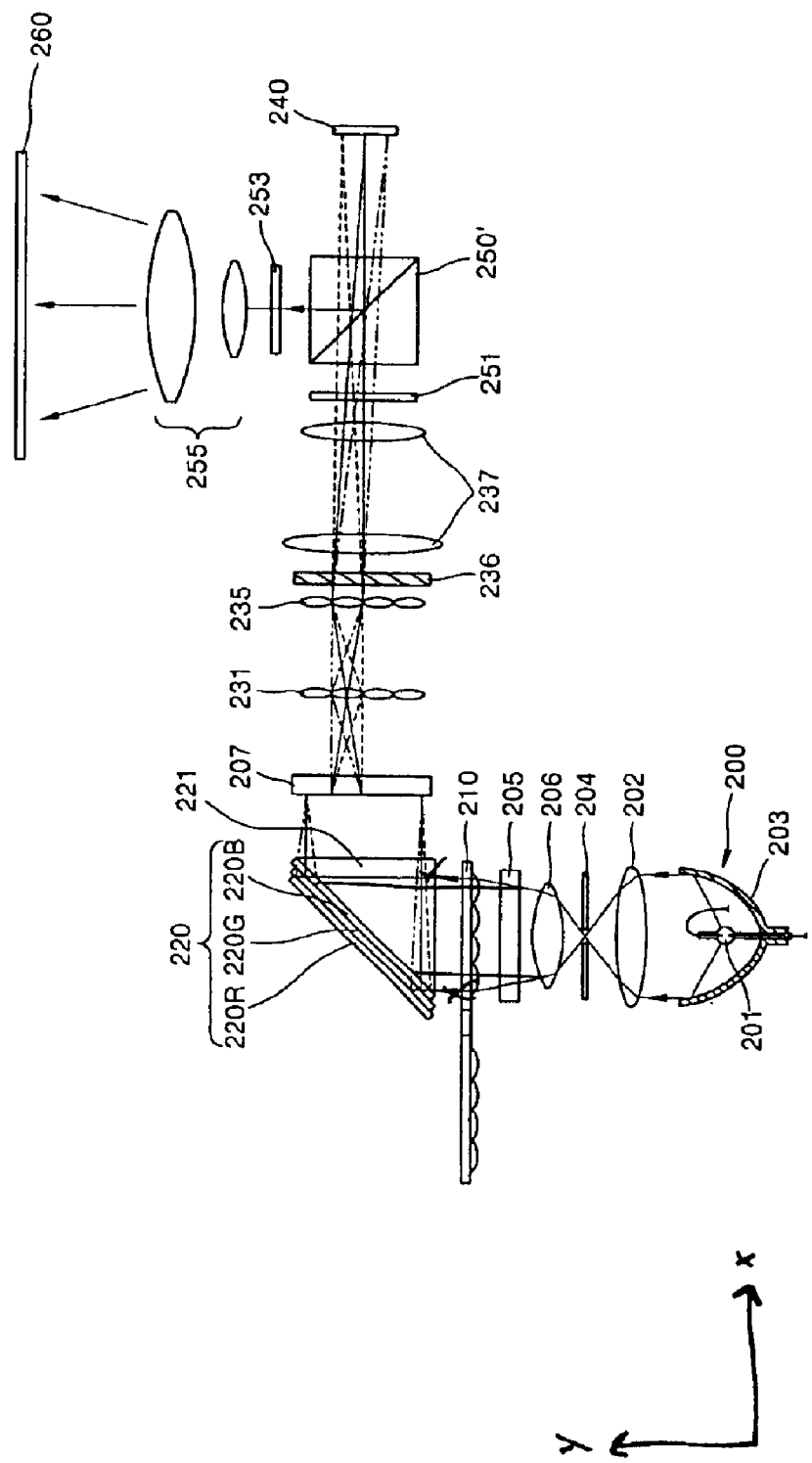
FIG. 9 is a schematic diagram of a modified example of a color scrolling projection system according to the first exemplary embodiment of the present invention.

FIG. 9 is a schematic diagram of a modified example of the projection system according to the first exemplary embodiment of the present invention. Compared with the projection system of FIGS. 3 through 8, the modified projection system includes a cubic PBS 250' instead of the plate-type PBS 250 and further includes at least one polarizing element, e.g. 251 and 253, for transmitting only light with a specific polarization in order to increase color purity and contrast. Elements described above are labeled with identical reference numbers and will not be described again here.

Polarizing elements 251 and 253 increase color purity and contrast are described in detail below.

In the PCS 236, the half wave plate can accurately only convert light in a specific wavelength range having the second linear polarization into light having the first linear polarization. Therefore, the conversion of the polarization of light in other wavelength ranges may not be accurate. In other words, the rate of this conversion varies according to wavelength range. Also, since the PBS included in the PCS 236 does not have an extinction ratio of zero, the PBS cannot transmit only light with a specific linear polarization and reflect light having the other linear polarization. In other words, when the beam with a specific linear polarization is transmitted by the PBS, light having the other polarization is also partially transmitted. This is true of the PBS with respect to reflection as well.

Consequently, due to the aforementioned characteristics of the half wave plate and the PBS of the PCS 236, the PCS 236 cannot completely convert all of the light emitted from the light source 200 to light with a single linear polarization. The light incident on the PBS 250' does not have a perfect single linear polarization, for example, a perfect first linear polarization.

As described above, if the light incident on the PBS 250' does not have a perfect first linear polarization but includes light with the second linear polarization, the PBS 250' reflects the beam with the second linear polarization together with the beam with the first linear polarization.

Likewise, the PBS 250' transmits the beam with the first linear polarization together with the beam with the second linear polarization, because the PBS 250' cannot have a zero extinction ratio.

Improving the extinction ratio of the PBS 250' boots the manufacturing costs. Hence, it is difficult for the PBS 250' to have a high quality extinction ratio.

However, if at least one polarizing element, for example at least one of polarizing elements 251 and 253, is disposed on at least one of the path of light emitted from the light source 200 and directed toward the PBS 250' and the path of light reflected by the light valve 240 and directed toward the projection lens unit 255 via the PBS 250', it is possible to transmit only light with a single polarization.

In FIG. 9, the polarizing elements 251 and 253 are disposed respectively on the path of light emitted from the light source 200 and directed toward the PBS 250' and the path of light reflected by the light valve 240 and directed toward the projection lens unit 255 via the PBS 250'.

The polarizing element 251, which is disposed on the path of light emitted from the light source 200 and directed toward the PBS 250', serves as a polarizer and transmits only a beam with a first linear polarization. The beam with the first linear polarization passes through the PBS 250' and travels toward the light valve 240. The polarizing element 253, which is disposed on the path of light reflected by the light valve 240 and directed toward the projection lens unit 255 via the PBS 250', serves as an analyzer. Hence, the polarizing element 253 transmits only a beam with a second linear polarization toward the projection lens unit 255.

As described above, the use of at least one of the polarizing elements 251 and 253 prevents the transmittance of light not having a first linear polarization by the PCS 236. If the polarizing element 253 is used as an analyzer, only a beam with a single linear polarization can be transmitted to the projection lens unit 255 regardless of the extinction ratio of the PBS 250'.

Hence, when at least one of elements 251 and 253 is used, color purity and contrast can be increased.

According to a second exemplary embodiment of the present invention, each of the polarizing elements 251 and 253 are preferably, but not necessarily, non-absorption polarizing elements. A non-absorption polarizing element transmits a beam with one polarization (a desired polarization) and reflects a beam with the other polarization (an undesired polarization). The non-absorption polarizing element may be a wire grid polarizer as described in U.S. Pat. No. 6,122,103, a reflective polarizer as described in U.S. Pat. No. 6,025,897, or a general PBS.

Alternatively, an absorption polarizing element which transmits a beam with one polarization (a desired polarization) and absorbs a beam with the other polarization (an undesired polarization) may be used as each of the polarizing elements 251 and 253.

A non-absorption polarizing element such as a wire grid polarizer or a reflective polarizer may also be used as the PBS of the PCS 236. The wire grid polarizer may be used as the PBS 250'.

In FIG. 9, a prism 221 is disposed adjacent to the color separator 220 to transfer incident light to the color separator 220 without changing the path of the incident light. The prism 221 is optional in the modified projection system of FIG. 9. The projection system of FIGS. 3 and 4 may further include the prism 221.

As described with respect to the first exemplary embodiment, FIGS. 10 and 11 are schematic diagrams of two projection systems according to a second exemplary embodiment of the present invention. A projection system according to the second exemplary embodiment of the present invention includes an adjusting part for adjusting the divergence angle (or etendue) of light emitted from a light source 300; a color separation part for separating the light emitted from the light source 300 into a plurality of color beams; and a scrolling part for scrolling a plurality of color bars on a light valve 240, which are sequentially disposed from the light source 300. The optical structure and function of the adjusting part and the scrolling part are the same as described above with respect to a projection system of the first exemplary embodiment.

In FIGS. 10 and 11, a reflective mirror 303 of the light source 300 is an elliptical mirror whose first focal point is the position of a lamp 301 and whose second focal point is a point where light is focused. The lamp-type light source 300 emits approximately unpolarized white light which travels is convergent on the second focal point of the mirror 303.

When, as here, an elliptical mirror is used as the reflective mirror 303 of a light source 300, convergent light emitted from the light source 300 focuses on the second focal point of the elliptical mirror and then diverges. Hence, a lens such as lens 202 of FIG. 3 is not used. A collimating lens 206, which collimates divergent light, is disposed to reduce the diameter of light emitted from the light source 300 to about 1/5 of the diameter of the light emitted from light source 300. A spatial filter 204 is disposed around the focal point of the elliptical mirror where the convergent light emitted from the light source 300 is focused.

As illustrated in FIG. 10, a projection system according to the second exemplary embodiment of the present invention includes, as the color separation unit, a color separator 320, which includes dichroic filters 320B, 320G, and 320R disposed at different angles with respect to each other.

Each of the dichroic filters 320B, 320G, and 320R reflects a beam in a specific wavelength range and transmits all other light. Based on this selective reflection and on the inclined disposition of the filters, the color separator 320 separates incident light into, for example, R, G, and B beams.

As illustrated in FIG. 11, a projection system according to the second exemplary embodiment of the present invention may include, as the color separation unit, an optical pipe 420, which includes dichroic prisms 421, 423, and 425. The dichroic prisms 421, 423, and 425 include dichroic filters 421a, 423a, and 425a, respectively, which are disposed at predetermined angles with respect to the axis of incident light. Each filter reflects a beam in a specific wavelength range. Hence, each of the dichroic prisms 421, 423, and 425 reflects, for example, B, G, and R beams, and transmits beams of other colors. As a result, the optical pipe 420 separates the incident light emitted from the light source 300 into a plurality of color beams, namely, R, G, and B beams, and emits the R, G, and B beams.

In the second exemplary embodiment of the present invention, a scrolling unit 210 is disposed between the color separator 320 or the optical pipe 420 and the light valve 240. The scrolling unit 210 receives the color beams from the color separator 320 or the optical pipe 420. As the scrolling unit 210 rotates, a plurality of color bars on the light valve 240 are scrolled.

In FIGS. 10 and 11, a first cylindrical lens 205 is disposed between the color separator 320 or the optical pipe 420 and the scrolling unit 210. Alternately, the first cylindrical lens 205 may be disposed between the collimating lens 206 and the color separator 320 or the optical pipe 420.

Since elements other than the above-described elements in the projection systems of FIGS. 10 and 11 are arranged in the same way as and have the same structure as those in the projection systems of FIGS. 3 and 9, they will not be described again here.

Also, since scrolling of a plurality of color bars on the light valve 240 with a rotation of the scrolling unit 210 in the projection systems according to the second exemplary embodiment of the present invention is the same as or similar to that in the first exemplary embodiment of the present invention, the description will not be repeated.

Although the optical arrangement of the elements in FIGS. 10 and 11 may vary from previously-described arrangements, various modifications to the optical arrangement of a projection system would be sufficiently understood from the previous examples.

As described above, a projection system according to the present invention has the following effects. First, since beams of distinct colors travel along a single path, the number of optical components can be reduced, thereby making the projection system more compact.

Second, a plurality of color bars can be scrolled with a rotation of a single scrolling unit , thereby scrolling all color bars at a continuous and consistent speed, synchronization of the color bar scrolling and the operation of the light valve can be easily controlled, and a high quality image can be obtained Thus, the projection system according to the present invention can overcome the described problems related to the use of the many optical components of a conventional rotating prism type scrolling system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection system comprising:

an adjusting part which adjusts the divergence angle or etendue of light emitted from a light source;

a scrolling part which scrolls a plurality of color bars on a light valve; and a color separating part which separates an incident beam emitted from the light source and transmitted by the scrolling part into a plurality of color beams, wherein the adjusting part, the scrolling part, and the color separating part are sequentially arranged from the light source.

2. The projection system of claim 1, wherein:

the scrolling part includes a scrolling unit, including at least one lens cell which converts a rotation of the scrolling unit into a rectilinear motion of an area of the lens cell on which light is incident; and a plurality of color bars focused on the light valve are scrolled according to the rotation of the scrolling unit.

3. The projection system of claim 2, wherein the color separating part includes a color separator, including a plurality of dichroic filters which are disposed parallel to each other, and which each reflect a beam in a specific wavelength range of the light transmitted by the scrolling unit and transmit beams in all other wavelength ranges.

4. The projection system of claim 1, wherein light directing toward the adjusting part is diverged after being focused or converged, and the adjusting part is located at or around the point where incident light is focused.

5. The projection system of claim 4, wherein the adjusting part is a spatial filter having a slit.

6. The projection system of claim 4, further comprising a collimating lens which collimates light transmitted by the adjusting part to form approximately parallel light.

7. The projection system of claim 1, wherein the adjusting part is a spatial filter having a slit.

8. The projection system of claim 2, wherein the at least one lens cell is spirally arranged on the scrolling unit.

9. The projection system of claim 8, wherein the lens cell of the scrolling unit is a cylindrical lens.

10. The projection system of claim 8, wherein the scrolling unit is a disk.

11. The projection system of claim 2, further comprising first and second fly-eye lenses, disposed between the scrolling unit and the light valve, which each include lens cells matched with the lens cells of the scrolling unit in a one-to-one correspondence and each transmit light from the scrolling unit to the light valve.

12. The projection system of claim 11, further comprising a relay lens which is disposed between the second fly-eye lens and the light valve and which transmits light transmitted by the second fly-eye lens such that beams of different colors are focused on different locations on the light valve.

13. The projection system of claim 2, further comprising a plurality of cylindrical lenses which are disposed in front of and behind the scrolling unit so as to adjust the width of light incident on the scrolling unit.

14. A projection system comprising:

an adjusting part which adjusts the divergence angle of light emitted from a light source;

a color separating part which comprises a plurality of dichroic filters each of which reflects a beam in a specific wavelength range, thereby separating an incident beam into a plurality of color beams; and a scrolling unit, comprising at least one lens cell, which converts a rotation of the scrolling unit into a rectilinear motion of an area of the lens cell through which light passes such that a plurality of color bars focused on the light valve are scrolled as the scrolling unit rotates, wherein the adjusting part, the scrolling part, and the color separating part are sequentially arranged from the light source.

15. The projection system of claim 14, wherein the color separating part comprises a plurality of dichroic filters, disposed at different angles with respect to each other.

16. The projection system of claim 14, wherein the color separating part comprises an optical pipe comprising a plurality of prisms, each of which includes a dichroic filter which reflects light of a specific color.

17. The projection system of claim 14, wherein light directing toward the adjusting part is diverged after being focused or converged, and the adjusting part is located at or around the point where incident light is focused.

18. The projection system of claim 17, wherein the adjusting part is a spatial filter having a slit.

19. The projection system of claim 17, further comprising a collimating lens which collimates light transmitted by the adjusting part to transmit approximately parallel light.

20. The projection system of claim 14, wherein the adjusting part is a spatial filter having a slit.

21. The projection system of claim 14, wherein the at least one lens cell is spirally arranged on the scrolling unit.

22. The projection system of claim 21, wherein the lens cell of the scrolling unit is a cylindrical lens.

23. The projection system of claim 21, wherein the scrolling unit is a disk.

24. The projection system of claim 21, further comprising first and second fly-eye lenses, disposed between the scrolling unit and the light valve, which each include lens cells matched with the lens cells of the scrolling unit in a one-to-one correspondence and each transmit light from the scrolling unit to the light valve.

25. The projection system of claim 24, further comprising a relay lens, disposed between the second fly-eye lens and the light valve, which transmits light from the second fly-eye lens so that beams of different colors are focused on different locations on the light valve.

26. The projection system of claim 14, further comprising a plurality of cylindrical lenses, disposed in front of and behind the scrolling unit so as to adjust the width of a beam incident upon the scrolling unit.

* * * * *